UNITED STATES PATENT OFFICE.

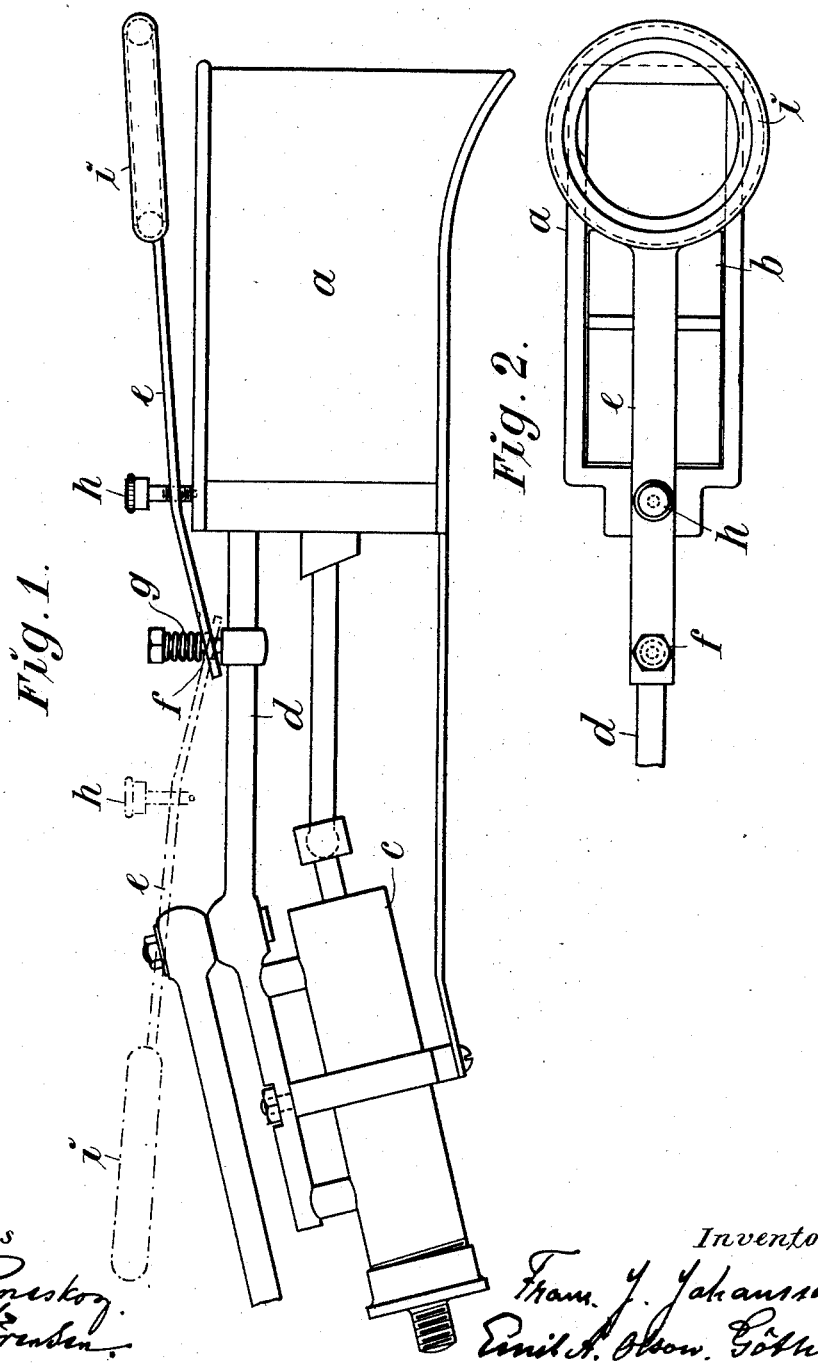

FRANS JOSEF JOHANSSON AND EMIL ALBERT OLSON GÖTHE, OF STOCKHOLM, SWEDEN.

MILKING-MACHINE.

998,294. Specification of Letters Patent. Patented July 18, 1911.

Application filed December 12, 1910. Serial No. 596,919.

*To all whom it may concern:*

Be it known that we, FRANS JOSEF JOHANSSON and EMIL ALBERT OLSON GÖTHE, subjects of the King of Sweden, residing at Stockholm, in the Kingdom of Sweden, have invented new and useful Improvements in Milking-Machines, of which the following is a specification, reference being had to the drawing accompanying and forming a part hereof.

This invention relates to improvements in milking machines and particularly to the teat supporting members sometimes used in such machines, said members bearing, during the milking operation, on the udder so as to hold the teat in a desired adjustable position in the teat cup.

The object of the invention is to provide a device of the said kind which is simple, durable and easily adjustable both in vertical and lateral direction and which is particularly adapted to be employed in teat cups consisting of a sleeve and a teat operating member reciprocating therein.

The invention consists, chiefly, in the teat supporting member being placed at one end of a rod or the like the other end of which is pivotally and springily attached to the teat cup, or some part connected thereto, said rod being combined with suitable adjusting means, such as a set screw inserted through a threaded hole in the rod and bearing on the teat cup or some part connected thereto. This arrangement enables the teat supporting member to be adjusted vertically by turning the set screw. If the teat supporting member is not to be used, it may be swung laterally into inoperative position.

The invention further comprises the construction and combination of parts hereinafter set forth.

In the drawing, we have shown by way of example, a suitable embodiment of the invention.

Figure 1 is a side view of a part of a milking machine having teat supporting members according to this invention. Fig. 2 is a plan view of the right hand part of Fig. 1.

Referring to the drawing, *a* is a sleeve inclosing a reciprocating compressing member *b* operated from without by a driving device *c*. The sleeve *a* is supported by a rod *d*. A pivot pin, screw bolt or the like *f* extends upward from the said arm *d* through a wide opening in one end of the teat supporting arm or rod *e*. Placed between the said rod *e* and a head on the bolt *f* is a spring *g* the tension of which may be adjusted by turning the said screw. Screwed through a threaded hole in the rod *e*, at a suitable distance from the bolt *f*, is a set screw *h* bearing on the sleeve *a*. The outer end of the rod *e* carries a ring *i* having a size enabling it to be placed about the thickest teats and located just above that part of the sleeve *a* which receives the teat.

By turning the screw *h* the rod *e* is caused to swing upward or downward at the bolt *f* by which the ring *i* is adjusted relatively to the sleeve *a*. If the teat is long, the ring *i* is moved away from the upper edge of the sleeve by which the teat is kept in a raised position relatively to the sleeve so that the lower part of the teat can be operated by the teat operating member *b*. If the teat is short, the ring *i* is lowered so as to allow the teat to sink deeper into the sleeve. If the teats are very short, the rod *e* may be turned around into the position shown by dotted lines by which the teat is allowed to sink into the sleeve *a* as deep as possible. In the position of the rod *e* shown by dotted lines said rod may be secured in position by tightening the screw *f* or by the rod *e* catching, under the influence of the spring *g*, into a recess in some part connected to the sleeve, such as the rod *d*.

We claim:

1. In a milking machine, the combination with a teat cup, of a yieldingly supported rod adapted to be swung laterally, a teat supporting member situated at the free end of the said rod, above the part of the teat cup receiving the teat, and a member adjustably supporting the said rod.

2. In a milking machine, the combination with a teat cup, of a yieldingly supported rod adapted to be swung laterally, a teat supporting member situated at the free end of the said rod, above the part of the teat cup receiving the teat, and a member adjustably supporting the said rod at a point between the fulcrum of the same and the teat supporting member.

3. In a milking machine, the combination with a teat cup, of a rod yieldingly supported at one end so as to be adjustable in a vertical plane, and adapted to be swung laterally, a teat supporting member situated at the free end of the said rod, above the part of the teat cup receiving the teat, and a screw inserted through a threaded hole in the said rod and bearing on a fixed part of the milking machine.

4. In a milking machine, the combination with a teat cup, of a rod having a hole at one end, a screw engaging the said hole, a spring placed between the head of the screw and the said rod and tending to press the latter downward, a teat supporting member situated at the free end of the said rod, above the part of the teat cup receiving the teat, and a screw inserted through a threaded hole in the said rod and bearing on a fixed part of the milking machine.

FRANS JOSEF JOHANSSON.
EMIL ALBERT OLSON GÖTHE.

Witnesses:
AUG. SORENSEN,
KARL RUNESKOZ.

Copies of this patent may be obtained for five cents each, by addressing the "Commissioner of Patents, Washington, D. C."